United States Patent
Eriksson

(10) Patent No.: US 9,942,708 B2
(45) Date of Patent: Apr. 10, 2018

(54) METHOD AND DEVICE OF TRACKING AN INDIVIDUAL

(71) Applicant: TIDLOG AB, Enköping (SE)

(72) Inventor: Magnus Eriksson, Enköping (SE)

(73) Assignee: TIDLOG AB, Enköping (SE)

( * ) Notice: Subject to any disclaimer, the term of this patent is extended or adjusted under 35 U.S.C. 154(b) by 0 days.

(21) Appl. No.: 15/305,269

(22) PCT Filed: Oct. 30, 2014

(86) PCT No.: PCT/EP2014/073378
§ 371 (c)(1),
(2) Date: Oct. 19, 2016

(87) PCT Pub. No.: WO2016/066205
PCT Pub. Date: May 6, 2016

(65) Prior Publication Data
US 2017/0230798 A1    Aug. 10, 2017

(51) Int. Cl.
*H04W 4/021* (2018.01)
*H04W 4/02* (2018.01)
*H04W 8/20* (2009.01)

(52) U.S. Cl.
CPC .......... *H04W 4/021* (2013.01); *H04W 4/025* (2013.01); *H04W 8/20* (2013.01)

(58) Field of Classification Search
CPC ....... H04W 4/028; H04W 4/021; H04W 8/26; H04W 4/046; H04W 4/025; H04W 4/043; H04W 4/02; H04W 4/027
See application file for complete search history.

(56) References Cited

U.S. PATENT DOCUMENTS

| 2007/0178908 A1* | 8/2007 | Doyle | G08G 1/127 455/456.1 |
|---|---|---|---|
| 2012/0278211 A1 | 11/2012 | Loveland et al. | |
| 2014/0274152 A1 | 9/2014 | Lichti | |
| 2015/0161553 A1* | 6/2015 | Eggleston | G06Q 10/063114 705/7.15 |

OTHER PUBLICATIONS

International Search Report and Written Opinion for International Application No. PCT/EP2014/073378 dated Jul. 14, 2015, 9 pages.

(Continued)

*Primary Examiner* — Magdi Elhag
(74) *Attorney, Agent, or Firm* — RatnerPrestia

(57) ABSTRACT

A device and method to track individuals. The device has a processing unit, and a memory containing instructions executable by the processing unit. The device receives a location with which at least one individual is to be associated, receives an indication of a geographical area in which the individual is allowed to move with respect to the location, and registers a first event in a database at a first time in response to a message received indicating that the individual is within the indicated geographical area. Further, the device tracks, in response to registering the first event, a geographical position of a mobile terminal of the individual, and registers a second event in the database at a second instant of time based on the tracked geographical position of the mobile terminal indicating that the individual no longer is within the indicated geographical area.

17 Claims, 2 Drawing Sheets

(56) References Cited

OTHER PUBLICATIONS

International Preliminary Report on Patentability for International Application No. PCT/EP2014/073378 dated Oct. 10, 2016, 7 pages.
Reply to the Written Opinion for International Patent Application No. PCT/EP2014/073378 dated Aug. 30, 2016, 8 pages.

* cited by examiner

METHOD AND DEVICE OF TRACKING AN INDIVIDUAL

This application claims the benefit of and priority to International Application No, PCT/EP2014/073378, filed Oct. 30, 2014, the contents of which are incorporated herein by reference.

TECHNICAL FIELD

The invention relates to a method and device of tracking an individual.

BACKGROUND

In the art, there are situations where it is difficult, if not impossible, to determine whether a person in fact has been at a place where he allegedly claims to have been. There is thus a need in such situation to be able to verify that the individual indeed has been at the place he claims to have been.

Thus, a system for tracking an individual in such a manner that the individual subsequently cannot call into question the tracking and its result is desired.

SUMMARY

An object of the present invention is to solve or at least mitigate this problem in the art and to provide a method and device of tracking an individual.

This object is attained in a first aspect of the present invention by a method of tracking at least one individual. The method comprises receiving a location with which the at least one individual is to be associated, receiving an indication of a geographical area in which the at least one individual is allowed to move with respect to said location, and registering a first event associated with the at least one individual in a database at a first instant of time in response to a message received indicating that the at least one individual is within the indicated geographical area. Further, the method comprises tracking, in response to the registering of the first event, a geographical position of a mobile terminal of the at least one individual, and registering a second event associated with the at least one individual in the database at a second instant of time based on a property of the tracked geographical position of the mobile terminal indicating that the at least one individual no longer is within the indicated geographical area.

This object is attained in a second aspect of the present invention by a device configured to track at least one individual. The device comprises a processing unit and a memory, which memory contains instructions executable by the processing unit, whereby the device is operative to receive a location with which the at least one individual is to be associated, receive an indication of a geographical area in which the at least one individual is allowed to move with respect to said location, and register a first event associated with the at least one individual in a database at a first instant of time in response to a message received indicating that the at least one individual is within the indicated geographical area. Further, the device is operative to track, in response to the registering of the first event, a geographical position of a mobile terminal of the at least one individual, and register a second event associated with the at least one individual in the database at a second instant of time based on the tracked geographical position of the mobile terminal indicating that the at least one individual no longer is within the indicated geographical area.

Advantageously, the present invention facilitates verification of whether an individual actually has been at a certain designated place as alleged, and if so for how long. Thus, the device, being for instance a server located remotely from the individual to be tracked, receives from an operator a geographical position to be monitored. For instance, the operator may be a purchaser of a particular service, and the geographical position may designate premises of the purchaser, which positions typically are entered by the purchaser via an app of her mobile phone. In addition, the purchaser enters via the app a geographical area around the assigned geographical location designating the premises where a provider of the service is free to move while still being considered to be on the premises, and sends the entered information to the server. Further, the server receives from the service provider, as a part of a log-in procedure for a work session, a registration indicating his presence on the premises via an app on the provider's smart phone. The server, or rather a microprocessor arranged at the server, will accordingly enter the registration in a database contained in a server memory. The registration is associated with a first event being related to the service provider being within the indicated geographical area, such as for instance an event denoted "work commences".

When the location of the premises has been registered by the microprocessor in the database of the server memory along with the geographical area in which the service provider is free to roam, the tracking of the service provider commences. As the service provider moves on the premises, his smart phone continuously sends an indication of his position to server. The server compares the reported position to the entry in the database of the memory where the geographical area in which the service provider is allowed to roam is registered. If the smart phone of the service provider reports a geographical position indicating that the service provider is outside the indicated geographical area, as detected by the server repeatedly performing comparison of the positions reported by the mobile phone with the entry in the database comprising the geographical area initially defined by the purchaser, the server will respond accordingly and record a second event in the database of the server memory. Now, this second event associated with the service provider as reported by his mobile phone could be denoted "service provider outside of designated area". If so, a total time period from log-in of the service provider to the registering of the second event can be recorded. The registration of the second event can thus be considered a log-out procedure for the work session.

Advantageously, this information can subsequently be used by the operator to verify e.g. that a reported date and time of the service provider in fact is correct or not.

In an embodiment of the present invention, the second event is registered if the tracked geographical position of the mobile terminal of the service provider is outside of the indicated geographical area. This is advantageous, since if the mobile phone of the service provider is outside of the area, it is very likely that the service provider himself is outside of the area and is thus no longer located on the premises for providing the service.

In another embodiment of the present invention, the second event is registered if a geographical positioning function of the mobile terminal for facilitating the tracking of the geographical position of the at least one individual is disabled. This is advantageous, since if the mobile phone of the service provider is turned off or if its Global Positioning System (GPS) functionality is disabled, an attempt to delude the server may be undertaken, and it can be suspected that the service provider himself indeed is outside of the area and is thus no longer located on the premises for providing the service, but is trying to conceal that fact.

In yet another embodiment, the second event is registered if the tracked geographical position of the mobile terminal of the service provider is within the indicated geographical area, but where the tracked geographical position has not changed during a specified time period. This is advantageous, since if the tracked geographical position of the service provider's mobile phone has not changed during a specified time period, the phone may have been placed on the premises in an attempt to delude the server, while the service provider himself has left premises.

Preferred embodiments of the present invention will be discussed in the following.

Further features of, and advantages with, the present invention will become apparent when studying the appended claims and the following description. Disclosed features of example embodiments may be combined to create embodiments other than those described in the following as readily understood by one of ordinary skill in the art to which this invention belongs, without departing from the scope of the present invention, as defined by the appended claims.

BRIEF DESCRIPTION OF THE DRAWINGS

The invention is now described, by way of example, with reference to the accompanying drawings, in which.

DETAILED DESCRIPTION

Figure 1:
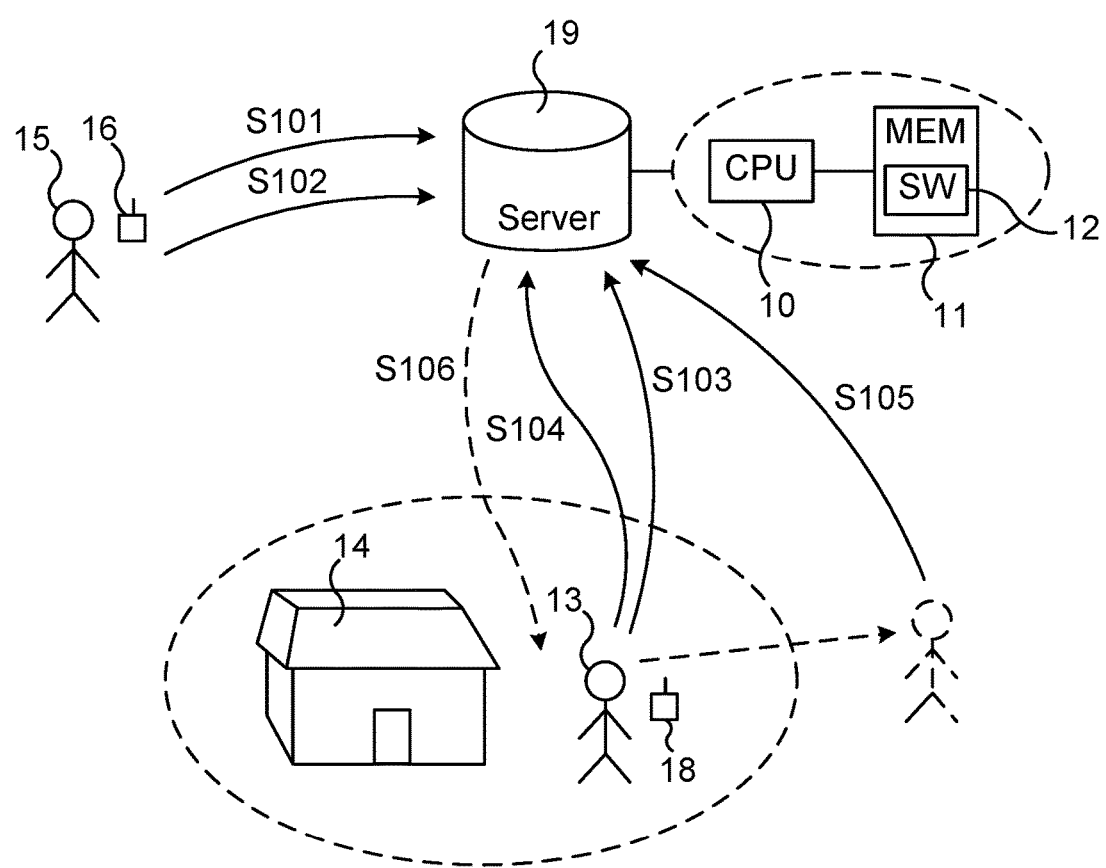
FIG. 1 is an illustration of a device according to an embodiment of the present invention and an exemplifying context in which the device may be implemented.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable. The first and second switch assemblies defined in the appended claims are occasionally referred to as main switches throughout the description, while the third and fourth switch assemblies occasionally are referred to as help switches throughout the description.

FIG. 1 is an illustration of a device to according to an embodiment of the present invention. It is assumed that an individual 13, such as for instance a craftsman in the form of a carpenter, electrician, plumber, etc., is hired to carry out work on the premises 14 of a customer 15. Prior to the craftsman 13 starting his work, the customer 15 assigns in step S101 a geographical position of the premises 14, typically via a so called app of her mobile phone 16 or tablet, or via her computer which is capable of communicating with the device to carrying out the method according to an embodiment of the present invention via the Internet. The assigned geographical position may be a particular street address. The device to is typically embodied in the form of processing unit such as a microcontroller or a central processing unit (CPU) being equipped with a memory 11 for storing a database and further software 12 comprising executable components for causing the CPU 10 to perform appropriate actions. The customer 15 further indicates in step S102 a geographical area 17 around the assigned geographical location designating the premises 14 where the craftsman 13 is free to move while still being considered to be on the premises 14. It should be noted that the geographical location and associated geographical area could be entered as a street address and a radius around the street address, but could alternatively for instance be indicate to the app by indicating an area by means of for instance a virtual pin in Google maps or any other appropriate map service. Further, the location and the geographical area in which the craftsman is allowed to move while still being considered to be on the premises 14 can both be entered in a single step S101.

The craftsman 13 thus registers in step S103 his presence on the premises 14 via a corresponding app on his smart phone 18. This can be considered a log-in procedure for a work session. The craftsman 13 may in an embodiment of the present invention further enter in the app an address of the premises were he is set to carry out his work. This is useful in case the customer has a number of premises on which the craftsman is to perform work, and an identification of a particular premise is required. Correspondingly, the customer needs to register, with the device, an allowed geographical area for each location in case a number of premises are envisaged. Hence, the CPU 10 receives in step S103 a signal or message from the smart phone 18 of the craftsman 13 indicating that a registration is made, and the CPU 10 will accordingly enter the registration in the database contained in the memory 12. The registration is associated with a first event at the CPU 10, such as for instance an event denoted "work commences". The CPU 10 will thus make a registration in the database of memory 12 accordingly.

Now, as the location of the premises 14 has been registered by the CPU 10 in the database of the memory 12 along with the geographical area 17 in which the craftsman is free to roam, the tracking of the craftsman 13 can commence. As the craftsman 13 moves on the premises 14, his smart phone 18 continuously sends an indication of his position to the CPU 10. Typically, Global Positioning System (GPS) functionality is available in the phone 18, which reports in, step S104, the position of the craftsman 13 repeatedly to the CPU 10 which accordingly compares the reported position to the entry in the database of memory 12 where the geographical area 17 in which the craftsman 13 is allowed to roam is registered. If the smart phone 18 of the craftsman 13 reports a geographical position being outside the area 17 in step S105, as detected by the CPU 10 repeatedly performing comparison of the positions reported by the mobile phone 18 in step S104 and the geographical area 17 initially defined by the customer in step S102, the CPU 10 will respond accordingly and record a second event in the database of the memory 12. Alternatively, the tracking in step S104 is performed by the app of the mobile phone 18 continuously comparing the positions of the mobile phone 18 with the indicated geographical area 17 initially entered by the customer 15 and submitted to the app of the mobile phone 18. This is advantageous since no repeated reporting is necessary to the server 19; instead, the app of the mobile phone 18 performs the tracking in step S104 and reports in S105 that the geographical position is outside the area 17. Now, this second event associated with the craftsman 13 as reported by his mobile phone 18 could be denoted "object outside of designated area". If so, a total time period from the moment of registration of the position of the craftsman 13 via his mobile phone 18 in step S103 to the tracking of step S104 and the reporting in step S105 indicating the craftsman 13 to be outside of the predetermined geographical entered in the database is recorded by the CPU 10 and recorded in the database of the memory 12. This time period can subsequently be used by the customer 15 to determine if, and how long, the craftsman 13 in fact was at the premises as entered by the customer 15 in the database via the CPU 10. The registration of the second event can thus be considered a log-out procedure for the work session.

As can be seen in FIG. 1, the CPU 10 and memory 12 may be arranged at a server 19 which is located remotely from the customer 15 and the craftsman 13, potentially even in another part of the world.

Should the craftsman 13 return into the designated geographical area 17 within a predetermined time period initially set by the customer 15 upon registration in step S101, such as e.g. a couple of minutes, the CPU 10 may in an embodiment of the present invention remove the registered second event and resume the tracking of the craftsman until another second event occurs. The CPU 10 will thus again with the help of the GPS of the mobile phone 18 track the craftsman 13 and make a record in the database of the memory 12 of the time period elapsing from the previous activation of the first event to a new second event occurring, indicating that the craftsman 13 again is outside of the designated geographical area 17.

However, in another embodiment, should the craftsman 13 exit the geographical area 17 as reported to the CPU 10 by his phone 18, the CPU 10 will request a new registration of the craftsman 13 via the smart phone 18 app, and the procedure of step S103 will have to be repeated.

In a further embodiment, the second event associated with the craftsman 13 is not that he exits the geographical area 17, but that the CPU 10 no longer receives any reports on the geographical position of the mobile phone 18, indicating either that the smart phone 18 has been turned off, or that its GPS functionality has been disabled. Either way, the CPU 10 will respond accordingly and record the second event in the database of the memory 12.

Now, this second event associated with the craftsman 13 as reported by his mobile phone 18 could be denoted "no geographic position recorded". If so, a total time period from the moment of registration of the position of the craftsman 13 via his mobile phone 18 in step S103 (i.e. the log-in) to the tracking of step S104 indicating the craftsman 13 to be outside of the predetermined geographical location entered in the database is recorded by the CPU 10 in the database of the memory 12. This time period can subsequently be used by the customer 15 to determine if, and how long, the craftsman 13 in fact was at the premises 14 as entered by the customer 15 in the database via the CPU 10.

In this context, it can be envisaged that if radio connection with the mobile phone 18 of the craftsman 13 is lost, i.e. the positioning is disabled, for instance if the craftsman 13 is in a basement or an elevator shaft, the craftsman may not be logged out, but registration of time from the moment of log-in may continue.

In an alternative embodiment, the geographical position of the mobile phone 18 is not repeatedly reported to the CPU 10 in step S104, but only reported once the craftsman 13 exits the geographical area. In such an embodiment, the app on the craftsman's phone 18 would typically need to be aware of the allowed geographical area 17 initially defined by the customer in step S102.

Information defining the initially indicated geographical area 17 would thus have to be transferred from the CPU 10 to the app of the craftsman's mobile phone 18. An advantage would be that the CPU 10 not repeatedly would have to receive and process positioning data reported by the mobile phone 18.

It should be noted that the CPU 10 may receive the message regarding the craftsman's current position from a central unit (not shown) tracking the craftsman 13 by receiving GPS signals accordingly from the mobile phone 18. Hence, the CPU 10 does not necessarily receive the message indicating the current position of the craftsman 13 directly from the craftsman's mobile phone 18.

In a further embodiment, the CPU will continuously receive signals indicating a movement of the craftsman's mobile phone 18, either as GPS signals as previously discussed, or possibly in the form accelerometer and/or gyroscope readings of the mobile phone 18. This is to assure that the craftsman 13 has not left his mobile phone 18 on the premises 14 (i.e. within the indicated geographical area 17), while having left the premises himself, thus trying to manipulate the CPU 10 into believing that the craftsman 13 is still located on the premises 14 of the customer 15. Hence, in this particular embodiment, the second event associated with the craftsman 13 is that his mobile phone 18 indeed is within the indicated geographical area, but that the tracked geographical position has not changed during a specified time period, such as for instance a couple of minutes.

In a further embodiment of the present invention, the CPU 10 may indicate to the craftsman 13 by an alert via the app on the mobile phone 18 that the second event is being registered. Hence, the craftsman 13 may be informed e.g. that he is outside of the geographical area 17 in which he is allowed to roam, or that he needs to move the phone 18.

In an embodiment, the customer 15 supplies the CPU 100 in step S101 with the phone number of each individual which is to participate on a work to be carried out on the premises 14 of the costumer. Again, this would typically be performed via an app on the mobile terminal 16 of the costumer 15. For a big project, a number of craftsmen can be envisaged working at the premises 14 of the costumer 15. Further, if the premises 14 is not a house of a private individual 15 as illustrated in FIG. 1, but rather e.g. a factory setting, hundreds of craftsmen may be involved. In such an embodiment, the respective craftsman for whom a phone number has been supplied by the customer 15 to the CPU 10 in step S101 is invited in step S106 to register his presence on the premises 14 via the corresponding app on his smart phone 18. As previously mentioned, this can be considered a log-in procedure for a work session.

If the craftsman has not yet downloaded the app upon receiving the invitation to log-in to the work session, the craftsman can be linked to App Store (for iOS) or Google Play (for Android) for downloading the app such that registration of the craftsman can commence. As soon as the craftsman 13 is on the premises 14, it is possible to log-in for registering the first event in order to start registration of work time.

Figure 2:
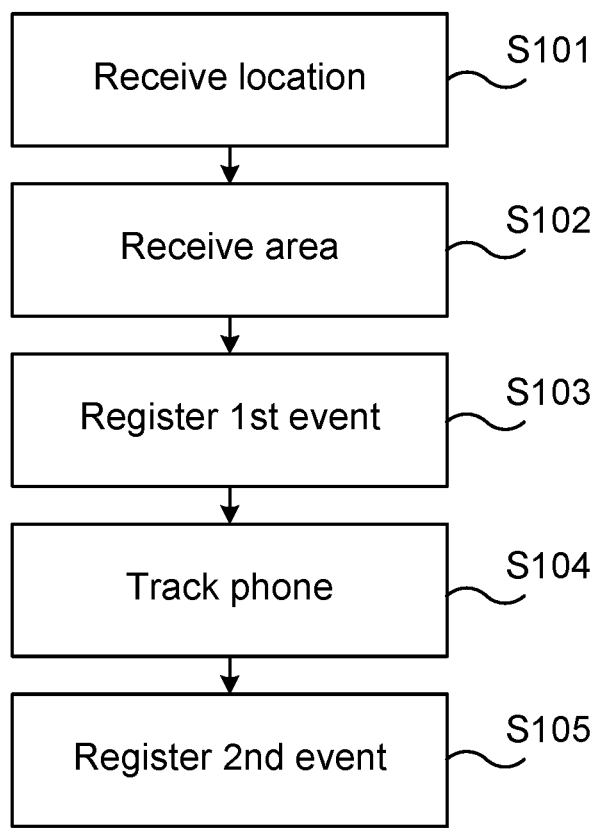
FIG. 2 illustrates a flowchart of a method according to an embodiment of the present invention.

FIG. 2 illustrates a flowchart of an embodiment of the method of tracking an individual according to the present invention. Reference is further made to FIG. 1 for structural elements. The method may for instance be performed at a device such as the server 19 being equipped with a processing unit 10 embodied in the form of one or more microprocessors or CPUs arranged to execute a computer program 12 downloaded to a suitable storage medium 11 associated with the microprocessor, such as a Random Access Memory (RAM), a Flash memory or a hard disk drive. The processing unit 10 is arranged to carry out the method of tracking an individual 13 according to embodiments of the present invention when the appropriate computer program 12 comprising computer-executable instructions is downloaded to the storage medium 11 and executed by the processing unit 10. The storage medium 11 may also be a computer program product comprising the computer program 12. Alternatively, the computer program 12 may be transferred to the storage medium 11 by means of a suitable computer program product, such as a Digital Versatile Disc (DVD) or a memory stick. As a further alternative, the computer program 12 may be downloaded to the storage medium 14 over a network. The processing unit 10 may alternatively be embodied in the form of a digital signal processor (DSP), an application specific integrated circuit (ASIC), a field-programmable gate array (FPGA), a complex programmable logic device (CPLD), etc.

Thus, in a first step S101, the CPU 10 receives from the customer 15 a geographical position of her premises 14, typically entered by the customer 15 via an app of her mobile phone 16. The CPU 10 further receives in step S102 a geographical area 17 around the assigned geographical location designating the premises 14 where the craftsman 13 is free to move while still being considered to be on the premises 14. The CPU 10 receives from the craftsman 13 in step S103, as a part of a log-in procedure for a work session, a registration indicating his presence on the premises 14 via an app on his smart phone 18. The CPU 10 will accordingly enter the registration in the database contained in the memory 12. The registration is associated with a first event at the CPU 10 being related to the craftsman 13 being within the indicated geographical area 17, such as for instance an event denoted "work commences".

When the location of the premises 14 has been registered by the CPU 10 in the database of the memory 12 along with the geographical area 17 in which the craftsman is free to roam, the tracking of the craftsman 13 can commence in step S104. As the craftsman 13 moves on the premises 14, his smart phone 18 continuously sends an indication of his position to the CPU 10 (or possibly to another central unit communicating with the CPU 10 as previously discussed). The CPU 10 compares the reported position to the entry in the database of memory 12 where the geographical area 17 in which the craftsman 13 is allowed to roam is registered. Alternatively, as previously has been discussed, the app of the mobile phone 18 repeatedly compares the position with the indicated geographical area 17. If the smart phone 18 of the craftsman 13 reports a geographical position being outside the area 17 in step S105, the CPU 10 will respond accordingly and record a second event in the database of the memory 12. Now, this second event associated with the craftsman 13 as reported by his mobile phone 18 could be denoted "object outside of designated area". If so, a total time period from the moment of registration of the position of the craftsman 13 via his mobile phone 18 in step S103 to the tracking of step S104 and the reporting in step S105 indicating the craftsman 13 to be outside of the predetermined geographical entered in the database is recorded by the CPU 10 and recorded in the database of the memory 12. This time period can subsequently be used by the customer 15 to determine if, and how long, the craftsman 13 in fact was at the premises as entered by the customer 15 in the database via the CPU 10. The registration of the second event can thus be considered a log-out procedure for the work session.

As previously described, other scenarios resulting in the second event being registered is in one embodiment that the geographical positioning functionality of the craftsman's mobile terminal 18 for facilitating the tracking of the geographical position is disabled, while in another embodiment the second event is registered if the tracked geographical position of the mobile terminal 18 of the craftsman 13 is within the indicated geographical area 17, but where the tracked geographical position has not changed during a specified time period.

In an embodiment, the registering of the second event by the CPU 10 causes the server 19 to alert the customer 15, for instance via the app on the mobile phone 16, or e.g. via e-mail.

Even though the invention has been described with reference to specific 300 exemplifying embodiments thereof, many different alterations, modifications and the like will become apparent for those skilled in the art. The described embodiments are therefore not intended to limit the scope of the invention, as defined by the appended claims.

The invention claimed is:

1. A method of tracking at least one individual, the method comprising:
    receiving a location with which the at least one individual is to be associated;
    receiving an indication of a geographical area in which the at least one individual is allowed to move with respect to the location;
    registering a first event associated with the at least one individual in a database at a first instant of time in response to a message received indicating that the at least one individual is within the indicated geographical area;
    tracking, in response to the registering of the first event, a geographical position of a mobile terminal of the at least one individual; and
    registering a second event associated with the at least one individual in the database at a second instant of time based on the tracked geographical position of the mobile terminal indicating that the at least one individual no longer is within the indicated geographical area;
    wherein the second event is registered if the tracked geographical position of the mobile terminal of the at least one individual is within the indicated geographical area, but where the tracked geographical position has not changed within the indicated geographical area during a specified time period.

2. The method of claim 1, wherein the second event is registered if the tracked geographical position of the mobile terminal of the at least one individual is outside of the indicated geographical area.

3. The method of claim 1, wherein the second event is registered if a geographical positioning function of the mobile terminal for facilitating the tracking of the geographical position of the at least one individual is disabled.

4. The method of claim 1, the message being received by means of the at least one individual logging in on an application on the mobile terminal when being within the indicated geographical area.

5. The method according claim 1, further comprising:
    cancelling the registration of the second event upon receiving an indication within a specified time period that the at least one individual again is within the indicated geographical area.

6. The method of claim 1, further comprising:
    indicating to the at least one individual via the mobile phone that the second event is being registered.

7. The method of claim 1, wherein in case a plurality of individuals are to tracked, the second event is registered upon indication that at least one of the plurality of individuals no longer is within the indicated geographical area.

8. The method of claim 1, wherein the step of registering the first event associated with the at least one individual in a database at the first instant of time in response to the message received indicating that the at least one individual is within the indicated geographical area comprises:
receiving a phone number of the at least one individual; and
sending an invitation to each individual for which a phone number has been received inviting the each individual to send the message indicating that the each individual is within the indicated geographical area.

9. A device configured to track at least one individual, the device comprising a processing unit and a memory, the memory containing instructions executable by the processing unit, whereby the device is operative to:
receive a location with which the at least one individual is to be associated;
receive an indication of a geographical area in which the at least one individual is allowed to move with respect to the location;
register a first event associated with the at least one individual in a database at a first instant of time in response to a message received indicating that the at least one individual is within the indicated geographical area;
track, in response to the registering of the first event, a geographical position of a mobile terminal of the at least one individual; and
register a second event associated with the at least one individual in the database at a second instant of time based on the tracked geographical position of the mobile terminal indicating that the at least one individual no longer is within the indicated geographical area;
wherein the second event is registered if the tracked geographical position of the mobile terminal of the at least one individual is within the indicated geographical area, but where the tracked geographical position has not changed within the indicated geographical area during a specified time period.

10. The device of claim 9, wherein the second event is registered if the tracked geographical position of the mobile terminal of the at least one individual is outside of the indicated geographical area.

11. The device of claim 9, wherein the second event is registered if a geographical positioning function of the mobile terminal for facilitating the tracking of the geographical position of the at least one individual is disabled.

12. The device of claim 9, the message being received by means of the at least one individual logging in on an application on the mobile terminal when being within the indicated geographical area.

13. The device according to claim 9, the device further being operative to:
cancel the registration of the second event in the database upon receiving an indication within a specified time period that the at least one individual again is within the indicated geographical area.

14. The device of claim 9, the device further being operative to:
indicate to the at least one individual via the mobile phone that the second event is being registered.

15. The device of claim 9, wherein in case a plurality of individuals are to tracked, the second event is registered upon indication that at least one of the plurality of individuals no longer is within the indicated geographical area.

16. The device of claim 9, wherein the device is operative to:
receive a phone number of the at least one individual; and
send an invitation to each individual for which a phone number has been received inviting the each individual to send the message indicating that the each individual is within the indicated geographical area in order to register the first event associated with the at least one individual in the database at the first instant of time.

17. A computer program comprising computer-executable instructions, residing on a non-transitory computer readable medium, for causing a device to perform the steps recited in claim 1 when the computer-executable instructions are executed on a processing unit included in the device.

* * * * *